(12) United States Patent
Solomon et al.

(10) Patent No.: US 7,443,869 B2
(45) Date of Patent: Oct. 28, 2008

(54) DEADLOCK AVOIDANCE QUEUING MECHANISM

(75) Inventors: Gary A. Solomon, Acton, MA (US); Edward Butler, Chandler, AZ (US); Joseph A. Schaefer, Chandler, AZ (US); David E. Mayhew, Northborough, MA (US); Todd R. Comins, Chelmsford, MA (US); Lynne M. Brocco, Cambridge, MA (US)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 10/745,737

(22) Filed: Dec. 23, 2003

(65) Prior Publication Data

US 2005/0030963 A1 Feb. 10, 2005

Related U.S. Application Data

(60) Provisional application No. 60/493,112, filed on Aug. 4, 2003.

(51) Int. Cl.
*G06F 13/38* (2006.01)

(52) U.S. Cl. .......................... 370/412; 710/52

(58) Field of Classification Search ................. 370/391, 370/413, 389, 379, 229, 357, 412; 710/30, 710/305, 314, 100, 52
See application file for complete search history.

(56) References Cited

U.S. PATENT DOCUMENTS

| | | | | |
|---|---|---|---|---|
| 5,689,508 A * | 11/1997 | Lyles | ......................... | 370/391 |
| 5,781,549 A * | 7/1998 | Dai | ............................. | 370/398 |
| 6,076,130 A * | 6/2000 | Sharma | ....................... | 710/310 |
| 6,426,957 B1 * | 7/2002 | Hauser et al. | ............... | 370/413 |
| 6,563,818 B1 * | 5/2003 | Sang et al. | ................... | 370/379 |
| 6,760,793 B2 * | 7/2004 | Kelley et al. | .................. | 710/52 |
| 7,042,842 B2 * | 5/2006 | Paul et al. | .................... | 370/229 |
| 7,088,710 B1 * | 8/2006 | Johnson et al. | ............. | 370/357 |
| 7,099,986 B2 * | 8/2006 | Pettey et al. | ................. | 710/314 |
| 7,165,131 B2 * | 1/2007 | Creta et al. | ................. | 710/100 |
| 2002/0181455 A1 * | 12/2002 | Norman et al. | ............. | 370/389 |
| 2004/0128410 A1 * | 7/2004 | Mayhew et al. | ............... | 710/30 |
| 2005/0058130 A1 * | 3/2005 | Christ et al. | ................ | 370/389 |
| 2006/0031621 A1 * | 2/2006 | Riley et al. | ................. | 710/305 |

OTHER PUBLICATIONS

Fischer et al., "A scalable ATM switching system architecture", IEEE, Oct. 1991, vol. 9, pp. 1299-1307.*

Mai Jin et al., "Non-blocking conditions in scalable ATM switches using path-switching scheme", IEEE, Jun. 18-22, 2000, vol. 3, pp. 18-22.*

* cited by examiner

*Primary Examiner*—Melvin Marcelo
(74) *Attorney, Agent, or Firm*—Blakely, Sokoloff, Taylor & Zafman LLP

(57) ABSTRACT

A queuing mechanism is described for managing packets between agents of a computer system. The queuing mechanism includes an ordered queue including a plurality of queue registers to store a plurality of packets. The queuing mechanism also includes a bypass queue coupled to the ordered queue, wherein, if a packet at head of the ordered queue is a delayed request and is stalled for lack of flow control credit, then the stalled packet is moved into the bypass queue.

26 Claims, 4 Drawing Sheets

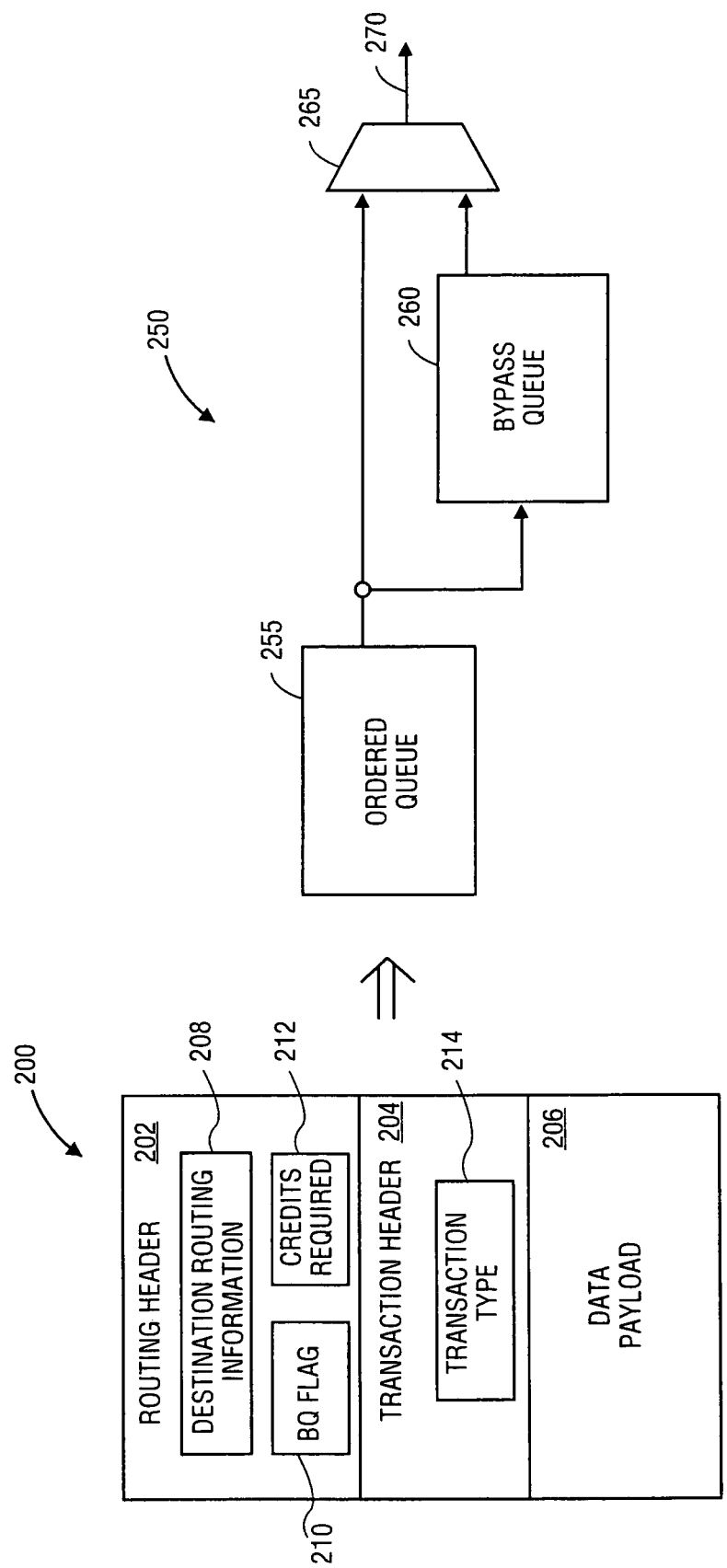

DEADLOCK AVOIDANCE QUEUING MECHANISM

RELATED APPLICATION

This application claims the benefit of U.S. Provisional Application No. 60/493,112, filed Aug. 4, 2003.

BACKGROUND

1. Field

Embodiments of the invention relate to the field of computer systems, and more specifically, to a system and method of managing packets between agents of a computer system.

2. Background

Computer systems may include buses and/or switch fabric to enable agents, such as microprocessors, storage devices, input/output (I/O) devices and other integrated circuits to communicate with each other. For example, Peripheral Component Interconnect (PCI) bus may be used to provide data path between two or more agents of computer system. PCI protocol and other communications protocols, such as Advanced Switching fabric services protocol, StarFabric protocol, etc, are required to follow a certain set of ordering rules to prevent data coherency problems and to avoid deadlock situations where data flows cannot make forward progress. In order to tunnel various communications protocols through a switch fabric, the switch fabric must support the mechanisms necessary to satisfy the ordering rules of the respective protocols to be tunneled.

BRIEF DESCRIPTION OF THE DRAWINGS

The invention is illustrated by way of example and not by way of limitation in the Figures of the accompanying drawings in which like references indicate similar elements. It should be noted that the references to "an" or "one" embodiment of this disclosure are not necessarily to the same embodiment, and such references mean at least one.

FIG. 2A illustrates a simplified representation of a packet according to one embodiment.

FIG. 2B illustrates a block diagram of a queuing mechanism according to one embodiment.

DETAILED DESCRIPTION

In the following description, specific details are set forth. However, it is understood that embodiments may be practiced without these specific details. In other instances, well-known circuits, structures and techniques have not been shown in detail to avoid obscuring the understanding of this description.

Figure 1A:
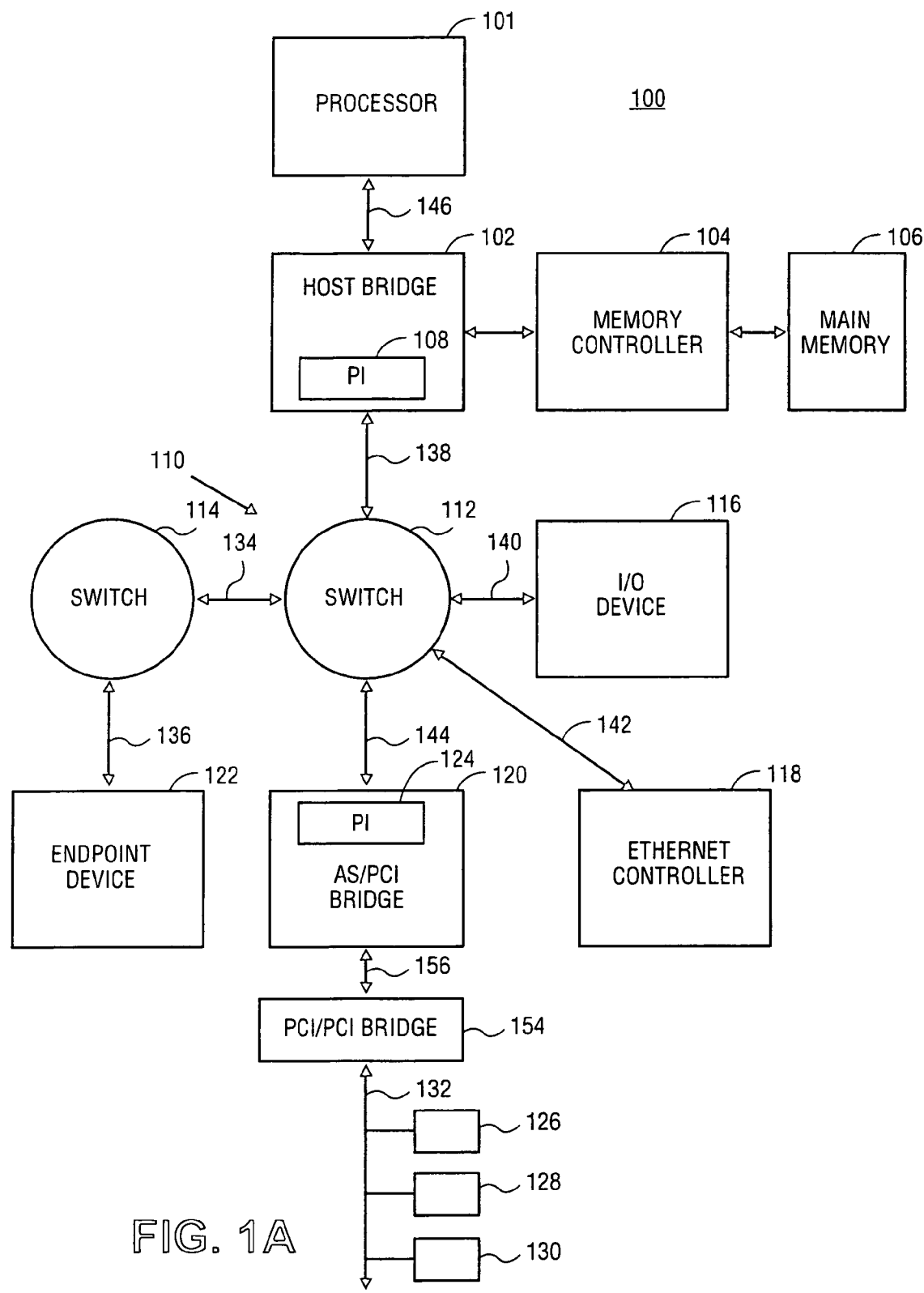
FIG. 1A illustrates a block diagram of one embodiment of a computer system in which the invention may be implemented.

FIG. 1A illustrates one embodiment of computer system 100 in which the invention may be implemented. System 100 includes processor 101, processor bus 146, memory controller 104 and main memory 106. Although described in the context of system 100, embodiments of the invention may be implemented in any suitable computer system comprising any suitable combination of integrated circuits.

Host bridge 102 and other devices are coupled via switch fabric 110. In one embodiment, switch fabric 110 is an Advanced Switching (AS) fabric, where some components attached to the fabric implement features to support the tunneling of PCI protocol, for example, as defined by PCI Local Bus Specification Revision 2.3 dated Mar. 29, 2002 and the PCI-X Addendum to the PCI Local Bus Specification Revision 1.0a dated Jul. 24, 2000, both by the PCI-SIG (Peripheral Component Interconnect-Special Interest Group), through the AS fabric. Switch fabric 110 includes one or more switches 112, 114 which controls data path between various devices of the computer system. Switches 112, 114 includes a number of ports, each port capable of connecting to another switch or a device within a computer system or network. In one embodiment, host bridge 102 implements protocol interface (PI) 108. PI 108 is an interface (hardware and/or software) that conditions the targeted protocol's packets for transmission through switch fabric 110.

The devices are connected to the switches 112, 114 via links (or fibers). A link is a point to point communication path between two devices. Communications between devices flows in both directions. (e.g., switches and endpoint devices) in a computer system or network. In the illustrated system 100, fabric 110 includes a first switch 112 coupled to devices (host bridge 102, I/O device 116, Ethernet controller 118, AS/PCI bridge 120, and a second switch 114) via five separate switching links 138, 140, 142, 144, 134, respectively. The second switch 114 is coupled to devices (switch 112 and endpoint device 122) via two separate switching links 134, 136, respectively. The endpoint device 122 may be a processing element or may be any device from which a transaction originates or terminates.

AS/PCI bridge 120 is coupled to PCI/PCI bridge 154 via PCI bus 156. In one embodiment, AS/PCI bridge 120 implements a protocol interface (PI) 124 to enable fabric 110 to tunnel PCI protocol through it. For packets that are about to exit the AS fabric, e.g., packets flowing from Switch 112 to AS/PCI bridge 120, the AS/PCI encapsulation bridge operates to remove fabric 110 routing information from the packet received over fabric 110 and to restore the packet data format to the original PCI transaction format for transmission onto PCI bus 156. For packets that are about to enter the fabric, AS/PCI bridge 120 operates to encapsulate the PCI transaction in a packet format suitable for transmission via switch fabric 110. PCI/PCI Bridge 154 has a number of slots adapted to receive a number of devices 126, 128 and 130. PCI/PCI Bridge 154 operates to control and coordinate the transmission and reception of PCI transactions between PCI bus 156 and devices 126, 128 and 130 located on PCI bus 132. Devices connected to the secondary bus 132 of PCI/PCI Bridge 154 can include, for example, a SCSI host adapter, and other I/O devices.

In operation, system 100 enables any of the devices, such as processor 101, memory controller 104, endpoint device 112, etc. to communicate via switches 112 and 114. Accordingly, any of the devices may send or receive packets via fabric 110 to and from any other device. Encapsulated PCI transactions (packets) transmitted between supporting devices 102 and 120 include requests and acknowledgements, such as posted memory write, delayed, or split read request, delayed, or split write request, delayed, or split read completion and delayed, or split write completion. In context of one embodiment, the following terms are to be construed as follows:

Posted memory write (PMW) is a transaction that has completed on the originating bus before completing on the destination bus. For example, PMW may include memory writes and memory write/invalidate commands.

Delayed read request (DRR-PCI protocol), or Split Read Request (SRR-PCI-X protocol), is a transaction that must complete on the destination bus before being fully completed on the originating bus. The final completion for transactions of this nature comes in the form of a return data payload from the destination of the original request. For example, DRR may include an I/O read, configuration read, memory read, memory read line, and memory read multiple command. PCI protocol does not regulate the flow of Delayed, or Split Read Requests and so therefore it is possible to oversubscribe a destination's capability to keep up with incoming requests of this nature, a condition that can lead to deadlock if not handled appropriately by the queuing mechanisms between source and destination.

Delayed write request (DWR-PCI protocol), or Split Write Request (SWR-PCI-X protocol), is a transaction that must complete on the destination bus before being fully completed on the originating bus. The final completion for transactions of this nature comes in the form of an acknowledgement transaction from the destination of the original request, acknowledging that the write payload had been received at the destination. For example, DWR may include an I/O write or configuration write command. PCI protocol does not regulate the flow of Delayed, or Split Write Requests and so therefore it is possible to oversubscribe a destination's capability to keep up with incoming requests of this nature, a condition that can lead to deadlock if not handled appropriately by the queuing mechanisms between source and destination.

Delayed read completion (DRC-PCI protocol), or Split Read Completion (SRC-PCI-X protocol), is a counterpart transaction that corresponds to a particular Delayed, or Split Read Request. DRC/SRC transactions return the requested data payload.

Delayed write completion (DWC-PCI-protocol), or Split Write Completion (SWC-PCI-X protocol) is a transaction that serves to acknowledge the reception, at the intended destination, of a particular corresponding Delayed, or Split Write Request.

It should be noted that fabric 110 may be implemented independent of any particular protocol. For example, device 126, 128 and 130 may implement a first bus protocol, such as PCI, and processor 101 implement a second bus protocol different from PCI. In order to tunnel various protocols through the fabric, the system is required to comply with ordering rules of the respective protocols. In one embodiment, protocol interface 108, 124 and deadlock avoidance queuing mechanisms are used to enable fabric 110 to operate with various protocols, including PCI.

Figure 1B:
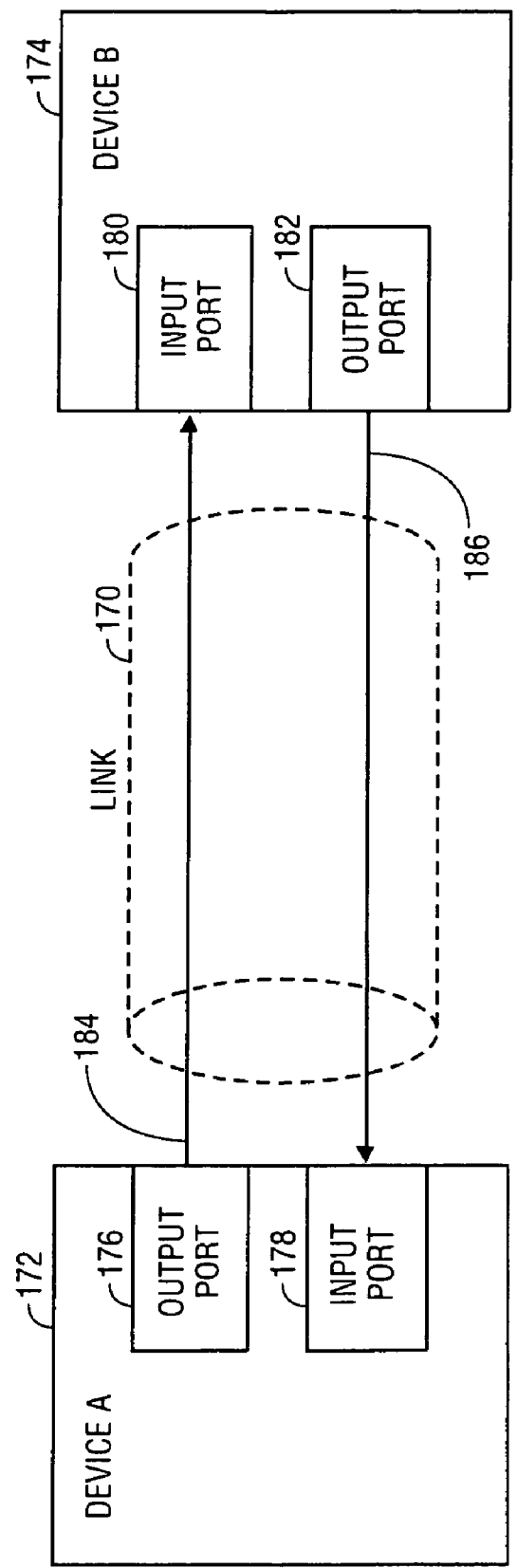
FIG. 1B illustrates a block diagram of a link according to one embodiment.

FIG. 1B illustrates a block diagram of a link according to one embodiment. As noted above, link 170 (or fiber) is a point to point path between two connect points with data flowing in both direction (e.g., switches and endpoint devices) in a fabric. Accordingly, a fabric may include a number of point-to-point links. Link 170 includes two unidirectional paths. Unidirectional path 184 of link 170 is connected between output port 176 of device A and input port 180 of device B; and unidirectional path 186 is connected between input port 178 of device A and output portion 182 of device B, thereby providing a dual simplex link. In accordance with one embodiment, packets are buffered as they pass through a link interface. In one embodiment, flow control is credit based.

FIG. 2A illustrates a simplified representation of packet 200, according to one embodiment, transmitted from one device to another via a link. Packet 100 includes routing header 202, encapsulated transaction header 204 and encapsulated transaction data payload (if the transaction carries a payload) 206. The encapsulated transaction header 204 immediately following routing header 202 has transaction type field 214 that indicates the nature of the packet, e.g., a split request, split completion, or memory write.

Routing header 202 includes, among other things, destination routing information 208, a bypass queue (BQ) flag 210 to direct queuing management logic, and a credits required field 212 to assist with cut through operations. The destination routing information 208 specified in routing header 202 is used by switches coupled through a link to move the packet to the proper destination device. Credits required field 212 provides a coarse accounting of credits that must be available to forward the packet to its link partner. This enables a switch to cut a packet through without having to wait for a final count of bytes as they are received. Link partners are two devices that share a common physical link between them.

According to one embodiment, the deadlock avoidance system uses the BQ flag 210 in routing header 202 to indicate whether a given packet opens up exposure to deadlock. Protocol interfaces 108, 124 sets BQ flag 210 for any packet that, if stalled for lack of flow control credit at any point in the fabric, could lead to deadlocking of the fabric. Accordingly, when BQ flag 210 is set, this indicates that the packet must be bypassed if stalled and is therefore eligible for bypass queue. When BQ flag 210 of a packet is not set, this indicates that the packet does not present any deadlock exposure, that it consumes ordered credit and is not bypassable.

FIG. 2B illustrates queuing mechanism 250 according to one embodiment. Queuing mechanism 250 is provided to enable deadlock free operation of a switch fabric where inherent deadlock exposure exists within targeted protocols. For example, in the PCI architecture, including PCI Express Base architecture, scenarios exist where it is possible to oversubscribe a destination's resources, and under certain conditions (e.g., where there is necessary feedback from these oversubscribed resource), this oversubscription can lead to fabric deadlock. In accordance with one embodiment, queuing mechanism 250 enables mitigation of this potential deadlock hazard by forcing certain, exposing packets, to be bypassed.

Switches and devices connected via a switch fabric may include input ports and output ports to receive and send packets to each other, as shown in FIG. 1B. Queuing mechanism 250 may be implemented in output port and/or input port of devices (e.g., switching devices and endpoint devices) coupled via a switch fabric. It should be noted that some of the devices and switches connected via a switch fabric may have multiple ports with multiple virtual channels for each port. In this case, the queuing mechanism may be implemented in each of the virtual channels for each port.

Queuing mechanism 250 includes ordered queue 255 having a number of queue registers. Ordered queue 255 operates under the First-In, First-Out (FIFO) scheme to propagate packets received in order. Queuing mechanism 250 also includes bypass queue 260 coupled to ordered queue 255. A packet from the head of ordered queue 255 may be moved into the tail of bypass queue 260 when the packet at the head of the ordered queue is of certain type and becomes stalled. In one embodiment, all traffic (packets) flowing through queuing mechanism 250 flow through ordered queue 255, and bypass queue 260 is used to move deadlock exposing packets out of the way to allow non-deadlock exposing packets in the ordered queue to pass.

In one implementation, deadlock situations may occur when tunneling PCI "non-posted request" transactions or other encapsulated protocols where oversubscribed resource (request/completion round trip) loops could result in deadlock. To avoid deadlock situations, if a packet at the head of the ordered queue is a delayed request (DRR and DWR) and is stalled for lack of flow control credit, queuing mechanism 250 will move the packet from the head of the ordered queue to the tail of the bypass queue. In the protocol interface logic for this protocol, the BQ flag in the packet header would be set for encapsulated DRR and DWR transactions to assure the proper handling of these transactions while making their way through the fabric.

In one embodiment, bypass queue 260 can hold relatively large number of packets in a relatively shallow queue because each request in the bypass queue carries little or no payload. In one embodiment, bypass queue 260 is used only for delayed read requests (DRRs) and delayed write requests (DWR), which carry limited payload (e.g., up to 4 bytes).

Also included in queuing mechanism 250 is arbiter 265 coupled to ordered queue 255 and bypass queue 260 to select a packet either from the head of the ordered queue or from the head of the bypass queue and to advance the selected packet to a subsequent device (e.g., link partner) via output 270 of the queuing mechanism. In one embodiment, arbiter 265 selects between the ordered queue and the bypass queue based on a fairness algorithm. The fairness algorithm implemented by arbiter 265 is configured to ensure that packets from one queue (i.e., ordered queue or bypass queue) are not stalled for a long time while packets from other queue make progress. For example, arbiter 265 may alternate between packets from ordered queue 255 and packets from bypass queue 260. In another implementation, arbiter 265 may implement a weighted-round-robin scheme to alternate between packets from ordered queue 255 and packets from bypass queue 260. An arbitration algorithm should, in establishing fairness, take into account the fact that the packets in the Bypass Queue have already been delayed due to lack of flow control credit. (the reason why they were bypassed).

As noted above, protocol interface sending a packet through a switch fabric may set the BQ flag 210 to indicate whether a given packet must be subjected to being bypassed (placed in the bypass queue 260). In one implementation, if the packet fits under the category of "delayed request", such as memory read, configuration read/write I/O read/write or an interrupt acknowledge, BQ flag 210 of the given packet is set to indicate that the packet is eligible for bypass queue 260. Accordingly, in one embodiment, bypass queue 260 is only ever used for packets whose routing header 202 has BQ flag 210 set. In accordance with one embodiment, only delayed/split read requests (DRRs/SRRs) and delayed/split write requests (DWRs/SWRs) are eligible for bypass queue 260. Other packet types, such as posted memory writes (PMWs), delayed/split read completions (DRCs/SRCs) and delayed/split write completions (DWCs/SWCs) are not specified as eligible to use the bypass queue 260 and will travel through ordered queue 255 only in an embodiment.

In operation, all packets, flowing through queuing mechanism 250, are entered into the tail of ordered queue 255. Packets from ordered queue 255 are propagated in the order of their receipt. Logic implemented in queuing mechanism 250 determines if the packet at the head of ordered queue 255 has set its BQ flag to high and it cannot be advanced due to lack of bypass queue (BQ) credits. If so, the packet is removed from the head of the ordered queue and moved into the tail of bypass queue 260. This prevents a packet (e.g., an encapsulated delayed read request) at the head of the ordered queue from blocking the progress of other packets emerging from the head of the ordered queue. It should be noted that once a packet has been entered into the bypass queue, it has met all ordering requirements with respect to other packets and may be propagated at any time.

If the packet at the head of ordered queue 255 does not have its BQ flag set, this means that the packet (e.g., an encapsulated posted memory write transaction) does not introduce any deadlock exposure. Accordingly packets of this nature remain in ordered queue 255 and will move beyond the head of the ordered queue when there is sufficient flow control credits to advance the packet.

Figure 3:
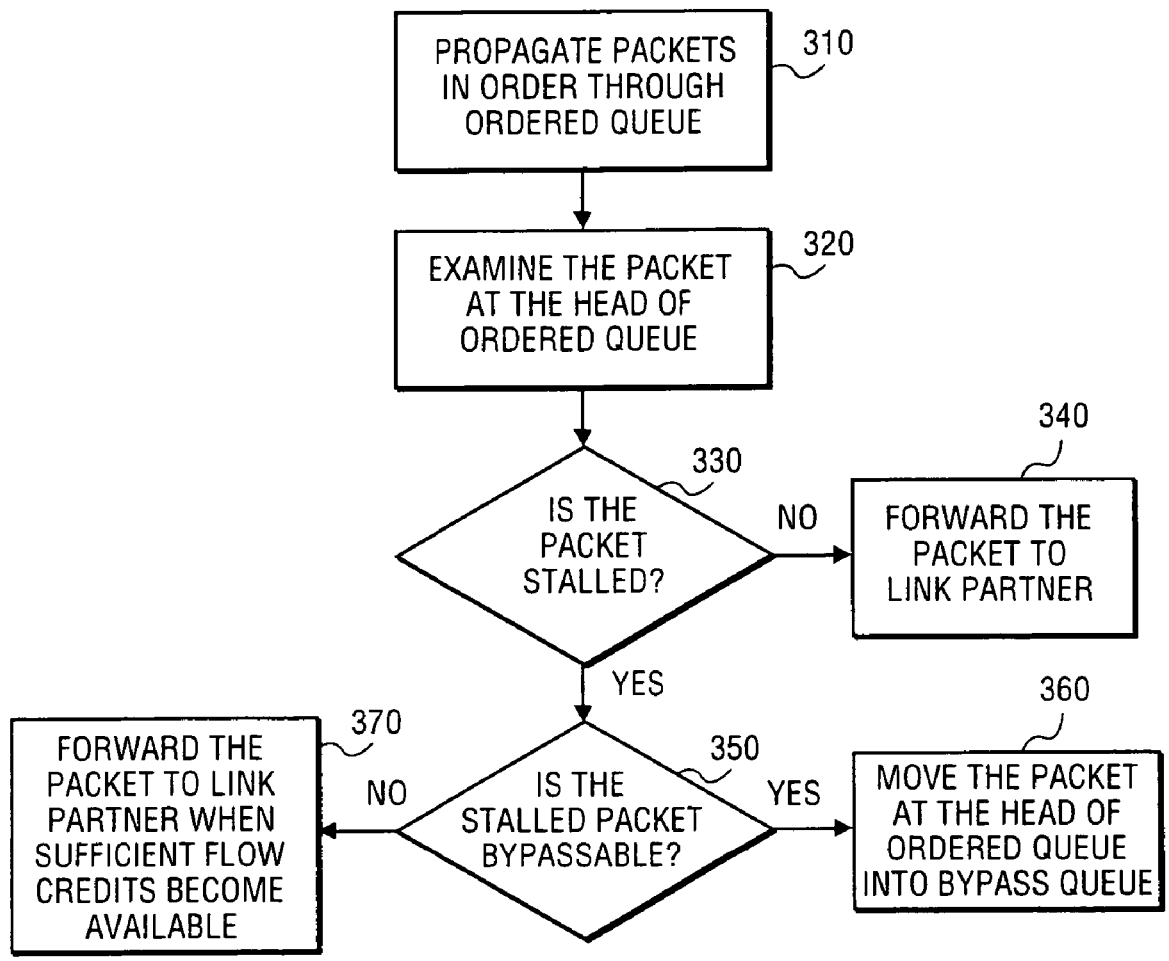
FIG. 3 illustrates a flow chart of operations of the queuing mechanism according to one embodiment.

Referring now to FIG. 3, the general operations of queuing mechanism 250 according to one embodiment are shown. In block 310, all incoming packets are received into the tail of the ordered queue. And the packets in the ordered queue are propagated in the order of their receipt. Next, in block 320, the queuing mechanism examines the packet at the head of the ordered queue to determine if there are sufficient flow control credits available to advance the packet at the head of the ordered queue to a subsequent device (e.g., link partner) via the output of the queuing mechanism. If the packet at the head of the ordered queue is stalled because it cannot advance due to lack of flow control credits (block 330, yes), then the queuing mechanism determines if the stalled packet is specified as bypassable in block 350. If there are sufficient flow control credits to advance the packet at the head of the ordered queue (block 330, no), the packet is propagated to the link partner.

As noted above, the BQ flag in the routing header is used to indicate whether a given packet could lead to deadlocking of the fabric. Accordingly, in block 350, the queuing mechanism determines if the stalled packet is bypassable (i.e., if the stalled packet is not bypassed, this may lead to deadlock) by checking the BQ flag in the routing header of the packet. Accordingly, if the BQ flag is set indicating that the stalled packet is bypassable (block 350, yes), the packet at the head of the ordered queue is moved off of the head of the Ordered Queue, and into the tail of the bypass queue in block 360 to enable other packets within the Ordered Queue, such as posted memory writes and delayed completions, to pass. Otherwise, if the BQ flag is not set indicating that the stalled packet is not bypassable (block 350, no), the packet will remain at the head of the ordered queue until there are sufficient flow credits to forward the packet to its link partner in block 370.

It should be noted that, in the illustrated embodiments, the queuing mechanism is used to preserve the ordering rules of PCI protocol. However, it will be apparent to those skilled in the art, the queuing mechanism and protocol interface may be used to suit other protocols that has similar attributes (such as Advanced Switching fabric services protocol, StarFabric protocol, or any other protocol that has inherent deadlock exposure) to preclude deadlock in a fabric. It should also be noted that the queue mechanism and protocol interface described herein may be modified to suit other protocols that have different set of ordering rules.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A queuing mechanism comprising:
   an ordered queue including a plurality of queue registers to store a plurality of packets; and
   a bypass queue coupled to the ordered queue, the bypass queue to receive at least one packet if the packet is stalled at a head of the ordered queue and to store the stalled packet if the packet includes a flag that is set by a source of the packet to indicate that the packet, if stalled, could cause a deadlock condition.

2. The queuing mechanism of claim 1, wherein, if a packet at a head of the ordered queue is a delayed request and is stalled for lack of flow control credit, then the stalled packet is moved into the bypass queue.

3. The queuing mechanism of claim 1, wherein the queuing mechanism is used to buffer the plurality of packets as the packets are passed through a link interface.

4. The queuing mechanism of claim 1, wherein all incoming packets, including posted memory writes, delayed requests and delayed completions, passing through the queuing mechanism, flow through the ordered queue.

5. The queuing mechanism of claim 1, wherein the bypass queue enables a posted memory write to pass a delayed request if the delayed request becomes stalled at the head of the ordered queue.

6. The queuing mechanism of claim 1, wherein the bypass queue enables a completion to pass a delayed request if the delayed request becomes stalled at the head of the ordered queue.

7. The queuing mechanism of claim 1, further comprising:
an arbiter coupled to the ordered queue and the bypass queue to select between a packet from the head of the ordered queue and a packet from the head of the bypass queue and to forward the selected packet.

8. The queuing mechanism of claim 2, wherein the delayed request includes interrupt acknowledge, I/O read, configuration read, memory read, memory read line, memory read multiple command, I/O write, and configuration write command.

9. The queuing mechanism of claim 1, wherein each packet of the plurality of packets propagating through the ordered queue includes a flag to indicate whether the packet, if stalled for lack of flow control credit, could lead to deadlock.

10. A system comprising:
a first device having an input port and an output port;
a second device having an input port and an output port;
a link coupled between the first device and the second device, the link including a first communication path between the output port of the first device and the input port of the second device, and a second communication path between the input port of the first device and output port of the second device; and
a plurality of queuing mechanisms to buffer packets as the packets are passed through the first and second communication paths between the first and second devices, each respective queuing mechanism comprising (1) an ordered queue including a plurality of queue registers to store a plurality of packets, and (2) a bypass queue coupled to the ordered queue, the bypass queue to receive at least one if the packet is stalled at a head of the ordered queue and to store the stalled packet if the packet includes a flag that is set by a source of the packet to indicate that the packet, if stalled, could cause a deadlock condition.

11. The system of claim 10, wherein, if a packet at a head of the ordered queue is a delayed request and is stalled for lack of flow control credit, then the stalled packet is moved into the bypass queue.

12. The system of claim 10, wherein each respective queuing mechanism is implemented in each of the output ports of the first and second devices.

13. The system of claim 12, wherein each respective queuing mechanism is implemented in each of the input ports of the first and second devices.

14. The system of claim 10, wherein all incoming packets passing through each respective queuing mechanism, including posted memory writes, delayed requests and delayed completions, flow through the ordered queue.

15. The system of claim 10, wherein the bypass queue enables a posted memory write to pass a delayed request if the delayed request becomes stalled at the head of the ordered queue.

16. The system of claim 10, wherein the bypass queue enables a completion to pass a delayed request if the delayed request becomes stalled at the head of the ordered queue.

17. The system of claim 10, wherein each respective queuing mechanism further comprises:
an arbiter coupled to the ordered queue and the bypass queue to select between a packet from the head of the ordered queue and a packet from the head of the bypass queue and to forward the selected packet.

18. The system of claim 11, wherein the delayed request includes interrupt acknowledge, I/O read, configuration read, memory read, memory read line, memory read multiple command, I/O write, and configuration write command.

19. The system of claim 10, wherein each packet of the plurality of packets propagating through the ordered queue includes a flag to indicate whether the packet, if stalled for lack of flow control credit, could lead to deadlock.

20. A method comprising:
buffering packets passed through a link interface, the packets including posted memory writes, delay requests, and delay completions;
propagating the received packets in order through a first queue; and
moving a at least one packet from a head of the first queue to a tail of a second queue if the packet is stalled at a head of the ordered queue and to store the stalled packet if the packet includes a flag that is set by a source of the packet to indicate that the packet, if stalled, could cause a deadlock condition.

21. The method of claim 20, wherein the packet from the head of the first queue is moved to the tail of the second queue if the packet is a delayed request and is stalled for lack of flow control credit.

22. The method of claim 20, further comprising enabling a posted memory write to pass a delayed request if the delayed request becomes stalled at the head of the first queue.

23. The method of claim 20, further comprising enabling a completion to pass a delayed request if the delayed request becomes stalled at the head of the first queue.

24. The method of claim 20, further comprising:
selecting between a packet from the head of the first queue and a packet from the head of the second queue; and
forwarding the selected packet.

25. The method of claim 20, wherein the delayed request includes interrupt acknowledge, I/O read, configuration read, memory read, memory read line, memory read multiple command, I/O write, and configuration write command.

26. The method of claim 20, further comprising setting a flag within each packet to indicate whether a packet propagating through the first queue, if stalled for lack of flow control credit, could lead to deadlock.

* * * * *